United States Patent [19]

Blair

[11] 4,275,559

[45] Jun. 30, 1981

[54] RETRACTABLE IGNITER DEVICE FOR GAS TURBINES

[75] Inventor: Lynn J. Blair, Ballston Lake, N.Y.

[73] Assignee: General Electric Company, Schenectady, N.Y.

[21] Appl. No.: 71,780

[22] Filed: Aug. 31, 1979

[51] Int. Cl.³ .................... F02C 7/266; H01T 13/14
[52] U.S. Cl. .................. 60/39.82 S; 313/126; 313/135
[58] Field of Search .............. 60/39.82 S; 361/253; 313/126, 135; 431/258, 264

[56] References Cited

U.S. PATENT DOCUMENTS

| | | | |
|---|---|---|---|
| 2,604,510 | 7/1952 | Berkey | 60/39.82 S |
| 3,548,592 | 12/1970 | Hopkins | 60/39.82 S |

FOREIGN PATENT DOCUMENTS 998371 7/1965 United Kingdom ............... 60/39.82 S Primary Examiner—Douglas Hart
Attorney, Agent, or Firm—Jerome C. Squillaro

[57] ABSTRACT

An electrical igniter device for a gas turbine includes a conductive tubular shell having a spark electrode section and an integral body section with an open breach end and a conductive sleeve coaxial with the body section for coaxially supporting one end of a helical spring. Means are described for retractably supporting the shell, sleeve and spring within a protective cylinder wherein the pressure in the combustion chamber exceeds the force exerted by the spring.

1 Claim, 1 Drawing Figure

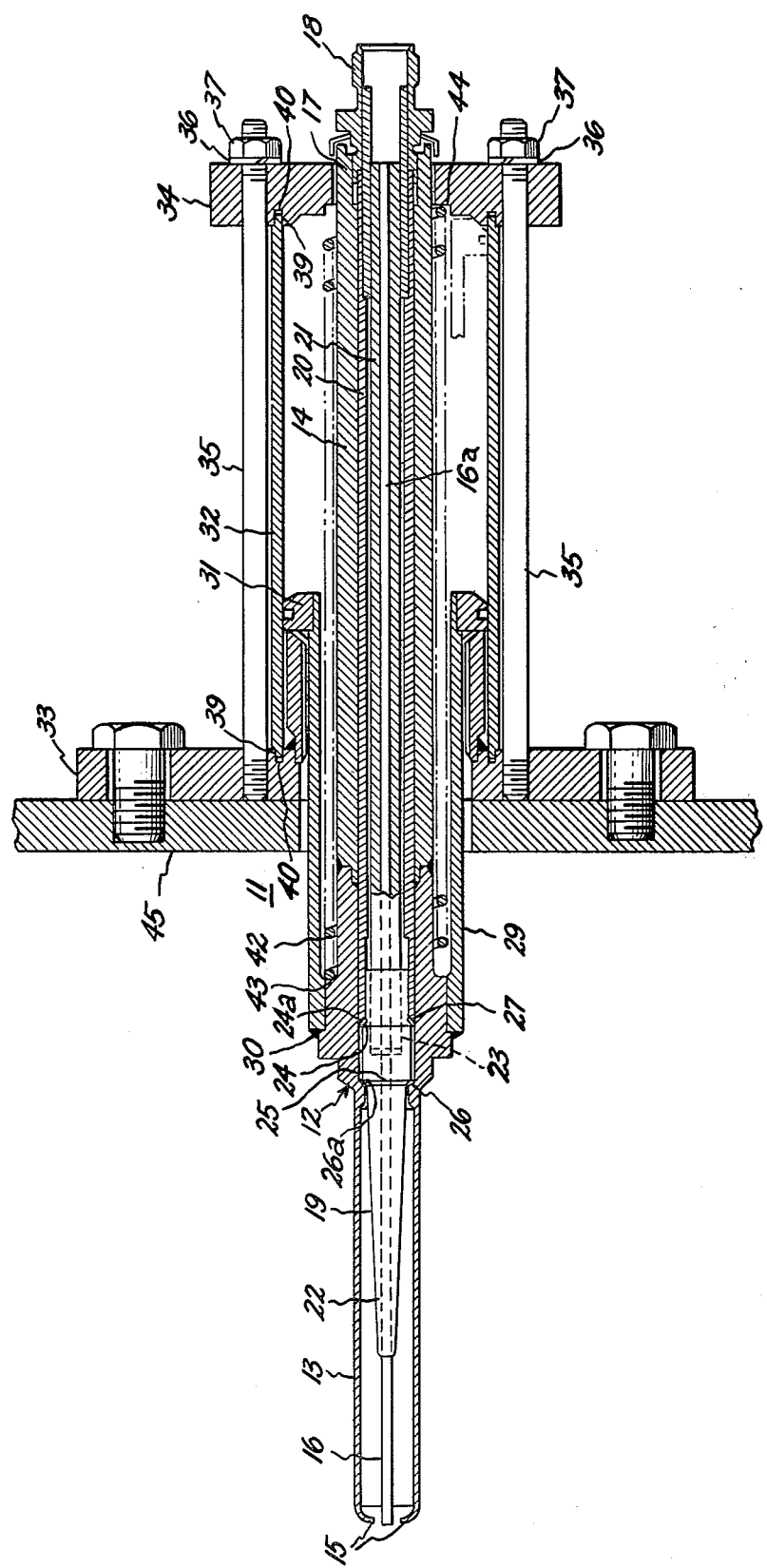

RETRACTABLE IGNITER DEVICE FOR GAS TURBINES

BACKGROUND OF THE INVENTION

The present invention relates to igniter devices for combustion apparatus, and more particularly to igniter devices for use in gas turbine systems.

Igniter devices of the type for use in gas turbines must be capable of igniting a combustion process within a chamber containing a combustible mixture. These devices typically accomplish this function by producing an electrical spark across a gap formed between oppositely charged electrodes of the igniter device. The spark so produced is sufficient to ignite the combustible mixture present in the combustion chamber.

In U.S. patent application Ser. No. 8,935 filed Feb. 2, 1979 by T. D. Farrell and of common assignee, an improved spark plug piston assembly is described as including a unitary conductive shell into which the internal igniter components are removably breech-loaded and assembled in an arrangement in which the internal components are protected over their entire length from the compressor discharge pressures and hot combustion products in the combustion chamber. Additionally, the internal components are retained in a predetermined position by means of a series of abutments and cooperating cylindrical retaining and insulating sleeves. Additionally, an end coupling engaged with the unitary shell removably secures the sleeves in their predetermined operative positions.

Igniter devices of the type described in the above referenced application are retractably mounted in a protective cylinder which under compressor discharge pressure cause the spark plug to retract into the protective cylinder. Typically, the igniter device is held in its fully extended position by a spring which is compressed during the retraction stroke. Unfortunately, with prior art igniters, the fully compressed length of the spring limits the extent of retraction. As a result, the size of the ignition device is greatly influenced by the fully compressed length of the spring.

Accordingly, an object of the present invention is to provide an improved retractable igniter having a greater stroke for retraction of the igniter from the hot combustion region and in which the retraction stroke is not limited by the compressed length of the spring.

It is yet another object of this invention to provide an improved igniter device with substantially the same physical dimensions but with approximately twice the stroke length of the prior art device.

SUMMARY OF THE INVENTION

The above and other objects and advantages of the present invention are achieved in accordance with one embodiment of an electrical igniter device including a conductive tubular shell having a spark electrode section and an integral body section with an open breech end and a conductive sleeve coaxial with the body section and forming a circumferential slot between the sleeve and the integral body section for supporting one end of a helical spring extending coaxially with the body section of the tubular shell. Means adjacent the breech end of the body section are provided for retractably supporting the shell, sleeve and spring within a cylindrical chamber including a base flange against which the other end of the spring abuts. Compressor discharge pressure acting on the piston assembly causes the assembly to retract into the cylinder, removing the spark electrode section from the flame and hot combustion region of the combustion chamber.

BRIEF DESCRIPTION OF THE DRAWING

The FIGURE is a sectional view of an improved retractable igniter device constructed in accordance with an embodiment of the present invention.

DESCRIPTION OF THE INVENTION

The invention as exemplified by the embodiment illustrated in the drawing includes a rectractable igniter 11 comprising a piston assembly 12 including a unitary conductive tubular shell with a spark electrode section 13 and a body section 14. The spark electrode section 13 of the conductive tubular shell is of reduced diameter and has a thinner wall section compared to the body section 14.

One end of the spark electrode section 13 includes a plurality of inwardly extending tabs 15 spaced from a central electrode 16 so that an electrical charge transmitted along the central electrode 16 (in a manner described more fully below) generates a spark across the gap between the tabs 15 and the spark electrode 16.

The opposite or breech end 17 of the piston assembly 12 is provided with an end coupling 18 which is removably secured to the breach end 17 and acts on a coaxial retainer 20. Within the body section 14 is a core assembly 19 including a tubular insulator 21 coaxial with the internal walls of the body section and a tapered insulative sleeve 22 around the central electrode 16. The tubular insulator 21 provides electrical insulation between the coaxial retainer 20 and an internal electrode 16a which is an extension of the central electrode 16. An electrical connection is made to the end of the internal electrode 16a adjacent the breach end 17 so that an electrical charge may be conveyed to the central electrode 16.

The core assembly 19 also includes a shoulder 25 adjacent a central bore 23 which shoulder abuts through a washer 26a with a complimentary shoulder 26 adjacent a transition region between the spark electrode section 13 and the body section 14. The core assembly 19 also includes a shoulder 24 which shoulder abuts through a washer 24a to a complimentary shoulder 27 on the coaxial retainer 20. In this way, the core assembly 19 is held in fixed relationship with the conductive tubular shell.

The piston assembly 12 further includes an outer conductive tubular sleeve 29 coaxial with the body section 14 with the sleeve having an inner diameter greater than the outer diameter of the body section and with one end of the sleeve 29 abutting a shoulder 30 located at a predetermined position on the outer surface of the body section 14. The sleeve 29 is secured to the outer portion of the body section 14 at the shoulder 30 by suitable means, such as by a circumferential weld. The other end of the conductive tubular sleeve 29 is provided with a circumferential ring 31 which is supported in slidable engagement with support means including a protective cylinder 32 which in turn is held in fixed relationship between a mounting flange 33 and a base flange 34 by tie rods 35, and washers 36 and nuts 37. The ends of the cylinder 32 are fitted into circumferential grooves 39 which are provided with gaskets 40 for ensuring a pressure-tight seal.

The piston assembly 12 is held in its fully extended position, as illustrated, by a helical spring 42 which has one end thereof resting against a shoulder 43 within the circumferential slot formed between the sleeve 29 and the body section 14. The other end of the spring 42 rests against a shoulder 44 in the base flange 34. Those skilled in the art can readily appreciate that the spring 42, in a partially compressed position, exerts sufficient force against the shoulder 43 causing the piston assembly 12 to be fully extended from the cylinder 32. However, when the retractable igniter 11 is connected to a combustion chamber 45 as illustrated with the spark electrode section 13 extending into the chamber, the combustible mixture in the chamber along with compressor discharge air causes the spark electrode section 13 to retract into the protective cylinder 32 and out of the region of the flame, thereby preventing damage to the retractable igniter. As illustrated in the drawing, the piston assembly 12 retracts to where the circumferential ring 31 rests against the base flange 34, thereby sealing the high combustion pressures and temperatures associated with the combustion chamber from the ambient atmosphere.

Those skilled in the art can readily appreciate that from the foregoing description an improved retractable igniter is described in which the stress on the spring and the fully compressed height of the spring are no longer limitations on the stroke of the piston assembly. This permits a larger retraction stroke in the same space previously required by prior art igniters.

The above described embodiment of the invention is intended to be exemplitive and not limiting and it will be appreciated from the foregoing by those skilled in the art that many changes and alterations may be made to the disclosed structure without departing from the fundamental concept of the invention.

What is claimed is:

1. An improved retractable igniter capable of igniting a combustible mixture in a combustor of a gas turbine comprising:

a piston assembly including a unitary conductive tubular shell with a cylindrical spark electrode section having an integral cylindrical body section, said electrode section being of reduced diameter and having a thinner wall section than said body section and said body section having an open breech end;

said body section including a core assembly comprising a tubular insulator coaxial with the internal walls of said body section and surrounding a central electrode extending from said spark electrode section to said breech end of said body section;

said piston assembly further including an outer conductive tubular sleeve coaxial with said body section, said sleeve having one end abutting a shoulder located at a predetermined position on the outer surface of said body section, the other end of said sleeve extending toward said breech end and forming a circumferential slot between said sleeve and said body section;

a helical spring coaxial with said body section and having one end abutting a shoulder within said circumferential slot and the other end resting against a shoulder in a base flange adjacent said breech end; and means for retractably supporting said piston assembly, said means including a protective cylinder held in fixed position between a mounting flange through which said piston assembly retractably extends and said base flange and a cylindrical ring attached to the other end of said outer conductive tubular sleeve;

said spark electrode section and a portion of said outer conductive tubular sleeve extending through said mounting flange when said piston assembly is fully extended and retracted into said protective cylinder when said spring is compressed, the compressed height of said spring being insufficient to limit the stroke of said piston assembly.

* * * * *